Patented Jan. 13, 1942

2,269,529

UNITED STATES PATENT OFFICE 2,269,529

EMULSIFIER AND EMULSION

Henry Arnold Goldsmith, Bronx, N. Y., assignor to Harry Bennett, Woodmere, N. Y.

No Drawing. Application June 15, 1940,
Serial No. 340,847

14 Claims. (Cl. 252—310)

This invention relates to emulsifiers and emulsions, particularly to emulsifiers for use in making emulsions that are stable under conditions ordinarily causing the breaking of conventional emulsions.

For making dispersions or emulsions, the two terms being used herein as having the same meaning, there have been proposed a very large number of emulsifiers. None of these, however, are satisfactory in making emulsions that must withstand moderately high concentrations of strong mineral acids, salts, or alkalies such as lime.

I have now discovered a new class of emulsifiers adapted to make emulsions stable under the severe conditions described.

The new emulsifiers comprise a higher fatty acid ester of polymerized polyhydric alcohols, the ester including no substantial amount of unesterified hydroxyl groups.

Such an ester may be represented by the general formula

$$RCO.OCH_2.CH_2.(OCH_2.CH_2)_x.OCH_2.CH_2.O.OCR_1$$

In this formula RCO represents an acyl group of a water insoluble carboxylic acid such as higher fatty acid, naphthenic acids, resin acids, and acids derived from the oxidation of paraffin or from the saponification of waxes; the acids may be substituted, as by hydroxyl, halogen, aryl, or other common substituent group, or not substituted. $R_1CO$ represents an equivalent combining proportion of the same or a different acid of the kind described, or a water soluble carboxylic acid such as maleic, citric, tartaric, or lactic acid. $x$ represents an integral number, as, for example 6 to 60.

Typical esters of this general formula are the di-esters of lauric, palmitic, oleic, and stearic acid with polymerized glycols, as, for example polymerized ethylene glycol having initially an average molecular weight of at least approximately 500 and suitably in excess of 1,000. As shown by the names of the acids used, the acids are non-polymerized and non-oxidized. Esters of other polymerized polyhydric alcohols may be substituted for the polyglycol esters provided the polyhydric alcohol in the ester is completely esterified. Good results have been obtained when the polymerized polyhydric alcohol as used has a molecular weight of about 500 to 4,000. Particularly satisfactory emulsifiers have been made from polymerized polyhydric alcohols of average molecular weight of approximately 2,500 or more.

In place of the polymerized ethylene glycol, there may be used other polyhydric alcohols of about the same degree of polymerization, as, for example, propylene glycol (1,2-dihydroxypropane), trimethylene glycol, and glycerol.

The highly polymerized polyhydric alcohol of the kind described is esterified with one or more of the selected acids, say, those given above, according to usual esterification technique. The polyhydric alcohol and selected acid or acids are mixed together in approximately equivalent proportions calculated on the basis of esterifying all of the esterifiable hydroxyl groups in the molecule of the polymerized polyhydric alcohol.

The mixture is then heated. The water of esterification is allowed to escape in the form of vapor, the final temperature of heating being above the boiling point of water but below the temperature of substantial decomposition of the product. Suitably there is used a small proportion, as, for instance ¼ to 1% or so, of an esterification catalyst. Thus, there may be used sulfuric acid or phosphoric acid.

Because of the stability of emulsions made with my emulsifiers, it is not necessary to neutralize the catalyst after the esterification is completed. However, it is satisfactory and also convenient to add pulverized anhydrous sodium carbonate or precipitated calcium carbonate, mix thoroughly, allow the mixture to stand until reaction seems to be practically complete between the acid catalyst and the added carbonate, and then separate the undissolved solid material, as by decantation or filtration.

The emulsifier so made is then ready for use in the making of emulsions.

For some purposes, particularly good results have been obtained when the completely esterified product of the kind described is blended with a substantial proportion of the mono-esters of the higher fatty acids either with the polymerized polyhydric alcohols of the kind described or with non-polymerized polyhydric alcohols. Among the esters of the non-polymerized alcohols that may be used are the monostearate, monooleate, or monopalmitate of glycol, ethylene glycol, propylene glycol or diethylene glycol. When the esters are those of stearic acid, then a very satisfactory proportion is approximately 50 parts of the di-ester to 100 of mixed mono-ester and di-ester. When the fatty acid esterified is lauric or oleic, then a good proportion is 2 parts of the di-ester to 1 of the mono-ester. In general, suitable proportions are 20 to 50 parts of the mono-ester for 100 parts of the mixed esters, larger proportions of the di-ester within this range being used when the acid esterified has a lower molecular weight or is more unsaturated than stearic acid.

In such blends of completely esterified and incompletely esterified polyhydric alcohols, emulsifying power is improved by the incorporation of a coupling agent. The coupling agent should be a material that is either soluble in both water and the ester composition or adapted to improve the solubility of the said composition in oil. Satisfactory coupling agents are organic compounds meeting the general requirements stated as, for example, selected from the glycol ethers, glycols, alcohols and fatty acids. Examples of satisfactory coupling agents are the following: mono or di-ethyl ether of ethylene glycol, diethylene glycol or butylene glycol; ethylene, diethylene or propylene glycol; and methyl, ethyl, isopropyl or tertiary butyl alcohol. The proportion of coupling agent may be varied in amount, but it is used to advantage in proportions of 1 to 10 parts of coupling agent for 100 parts of the emulsion to be made.

For some purposes, our emulsifier may be mixed with a wetting agent as, for example, sodium salts of sulfonated alkyl naphthalene, sulfated fatty alcohol, or dialkyl esters of sulfosuccinic acid.

In making the mixture of di-ester and mono-ester, the esterification method described may be utilized, with the exception that the proportion of fatty acid used is reduced to the amount required to produce the desired proportions of the mono-ester and di-ester.

In making emulsions, the emulsifier is used in proportion which varies somewhat with the use for which the emulsion is intended. Ordinarily 1 to 15 parts of the emulsifier to 100 parts of the finished emulsion are satisfactory, proportions here and elsewhere herein being expressed as parts by weight. When too little emulsifier is used, then the resulting emulsion is unstable under the severe conditions of use for which the present emulsions are formulated. When excessively large amounts of the emulsifier are used, on the other hand, then there is wastage due to the unnecessary consumption of emulsifier. For some emulsions that are intended to be oly temporary, as for example, certain agricultural sprays, the proportion of emulsifier may be as low as 0.1 part to 100 parts of total emulsion. Emulsions containing mineral acids are stable, as stated, except that there may be a gradual hydrolysis of the emulsifier, causing loss of emulsifying power over a long period of time, varying with the conditions that prevail.

The emulsifiers made as described are of the consistency of greases. When stearic acid has been used as the fatty acid in the ester, the greases are relatively firm and uniform. When oleic acid or another higher fatty acid of relatively low melting point is used, then the greases may be soft and partly liquid at ordinary temperatures.

Typical compositions that may be made with the improved emulsifiers are given below.

Cosmetic cream

The selected materials are warmed and stirred together, to make creams suitable for cosmetic use, either alone or after the admixture of ingredients that are conventional for cosmetic purposes. The following is a typical composition.

| | Parts |
|---|---|
| Stearic acid esters of polyethylene glycol | 10 |
| Stearic acid | 10 |
| Paraffin wax | 15 |
| Mineral oil | 15 |
| Petrolatum | 10 |
| Salt, such as sodium chloride | 6 |
| Water | To make 100 |

In the above example, the salt may be omitted unless its presence is desired. The fact that the emulsion is stable in the presence of such concentration of salt shows the high degree of stability obtained.

A suitable mineral oil is the kind ordinarily used in cosmetics.

Another cream including my emulsifier is the following:

| | Parts |
|---|---|
| Stearic acid esters of polyethylene glycol | 15 |
| Spermaceti | 5 |
| Glycerine | 3 |
| Aluminum chloride, hydrated crystals | 12 |
| Water | To make 100 |

In the above formula, also, the stability in the presence of a moderately high proportion of aluminum chloride is evidence of the resistance of the emulsion to breaking. The aluminum chloride may be omitted if the astringent property imparted by the aluminum chloride is not desired.

Lime emulsion

An emulsion of high content of alkalinity may be made of the following composition:

| | Parts |
|---|---|
| Mixed mono and di-fatty acid esters of polyethylene glycol of average molecular weight 530 | 10 |
| Mineral oil | 20 |
| Paraffin wax | 20 |
| Lime | 5 |
| Stearic acid | 12 |
| Water | To make 100 |

The stability of the above composition in the presence of lime indicates the utility of the formula for lime compositions such as a stabilized Bordeaux mixture used as an insecticide.

A quick-breaking agricultural spray is the following:

| | Parts |
|---|---|
| Distearate of polymerized ethylene glycol of molecular weight 530 | 2.5 |
| Monostearate of polymerized ethylene glycol of molecular weight 530 | 2.5 |
| Bordeaux mixture | 95.0 |

Antiseptic cream

An antiseptic cream is made of the following compositions:

| | Parts |
|---|---|
| Mixed mono and di-fatty acid esters of polyethylene glycol | 10 |
| Stearic acid | 10 |
| Paraffin wax | 15 |
| Mineral oil | 15 |
| Petrolatum | 10 |
| Oxy-quinoline sulfate | 0.2 |
| Water | To make 100 |

Liquid emulsions

A liquid emulsion may be made for use, for example, as a cutting oil or in insecticides. Such an emulsion is illustrated in the following example:

| | Parts |
|---|---|
| Oleic acid esters of polyethylene glycol | 5 |
| Oleic acid | 5 |
| Mineral oil | 35 |
| Water | To make 100 |

Cleansing emulsion

A cleansing emulsion suitable for use on porcelain, metals, or cement is made of the following composition:

| | Parts |
|---|---|
| Oleic acid esters of polyethylene glycol | 15 |
| Oleic acid | 5 |
| Mineral oil | 30 |
| Hydrochloric acid | 6 |
| Water | To make 100 |

Another cleansing emulsion that may be used is of the following composition:

| | Parts |
|---|---|
| Distearate of polymerized ethylene glycol of average molecular weight 1,600 | 10 |
| Stearic acid | 5 |
| Mineral oil | 15 |
| Hydrochloric acid, commercial concentrated acid diluted with 9 times its weight of water | 70 |

Acid wax polish

An acid wax polish is made of the following formula:

| | Parts |
|---|---|
| Candelilla wax | 20 |
| Distearate of polymerized ethylene glycol, molecular weight 1,600 | 5 |
| Phosphoric acid, 85% solution | 5 |
| Water, added at approximately the boiling point | 70 |

Another acid emulsion is made of the following materials, in the proportions shown:

| | Parts |
|---|---|
| Distearate of polymerized ethylene glycol, molecular weight 1,600 | 15 |
| Monostearate of glycerine | 15 |
| Paraffin wax | 6 |
| Hydrochloric acid, commercial concentrated solution diluted with 9 times its weight of water | 64 |

Mineral oil emulsion

An emulsion of mineral oil, of about the boiling range of medicinal or cosmetic mineral oil, is made of the following composition:

| | Parts |
|---|---|
| Dilaurate of polymerized ethylene glycol molecular weight 2,200 | 15 |
| Oleic acid | 5 |
| Mineral oil | 30 |
| Hydrochloric acid, commercial concentrated solution | 6 |
| Water | 44 |

Another mineral oil emulsion is made of the following formula:

| | Parts |
|---|---|
| Dilaurate of polymerized ethylene glycol molecular weight 2,200 | 15 |
| Oleic acid | 5 |
| Mineral oil | 30 |
| Sodium chloride, aqueous 10% solution | 50 |

In the above formula the sodium chloride solution may be replaced by a solution of tartaric acid, say, of concentration 10%. Also the mineral oil may be replaced by other oily material as, for example, by toluene, pine oil, a fatty vegetable oil, kerosene or naphtha, the proportion of water being decreased somewhat if necessary to give desired stability.

Toluol emulsion

A toluol emulsion of the above type is made of the following composition:

| | Parts |
|---|---|
| Dilaurate of polyglycol, molecular weight 2,200 | 20 |
| Toluol | 30 |
| HCl, concentrated aqueous solution | 6 |
| Water | 44 |

Another toluol formula is the following:

| | Parts |
|---|---|
| Dilaurate of polyglycol, molecular weight 2,200 | 10.2 |
| Diglycol monolaurate | 6.7 |
| Toluol | 44.5 |
| Water | 38.6 |

Pine oil emulsion

A pine oil formula is the following:

| | Parts |
|---|---|
| Mixed oleic acid esters of polyglycol, molecular weight 530 | 10 |
| Pine oil | 40 |
| Diglycol monooleate | 7 |
| Oxalic acid | 2 |
| Water | 41 |

In making the emulsions of the kind described, the materials selected are intimately mixed. If any of the materials are solids that are fusible at a temperature below the boiling point of water, then the intermixing is made suitably at a temperature sufficiently elevated to fuse the solid materials.

My emulsions are such that they may be produced by very simple mixing means. The emulsions are particularly even, uniform and non-separating under conditions of storage and use.

They are stable in the presence of moderately high concentrations of mineral acids, salts, or alkalis of strength about that of lime, as shown by the inclusion in certain examples above of such proportions of these electrolytes as would cause the breaking of conventional emulsions.

The emulsifiers show high dispersing and wetting power, as may be shown by testing in the following manner: To 50 cc. of an aqueous solution containing 0.5% of the emulsifier, there is added 1 gram of carbon black, without stirring. Quick sinking of the carbon black indicates a high rate of wetting. The resulting mixture is now stirred and filtered through paper. Carbon black is carried through the filter, due to the high emulsifying power of the emulsifier, the filtrate appearing black. In this test particularly good dispersing or emulsifying power is shown by the di-esters or mixed di and mono-esters of polymerized polyhydric alcohols of molecular weight of the order of 2,500, say, about 2,500 to 4,000.

It will be understood that the term "molecular weight" where used herein means average molecular weight.

It will be understood, also, that the details given are for the purpose of illustration. Variations within the spirit of the invention are intended to be included within the scope of the appended claims.

What I claim is:

1. An emulsifier comprising a higher fatty acid ester of a polymerized polyhydric alcohol, the hydroxyl content of the polymerized polyhydric alcohol being substantially completely esterified, the fatty acid represented in the ester being non-polymerized and non-oxidized, and the polymerized polyhydric alcohol represented having an average molecular weight of at least approximately 500.

2. An emulsifier comprising a mixture of the ester described in claim 1 and the mono-ester of a higher fatty acid with a polymerized polyhydric alcohol, each of the esters being present in substantial proportions.

3. An emulsifier comprising higher fatty acid esters of a polymerized glycol including the mono-ester and di-ester in intimate mixture with each other, the mono-ester being in the proportion of 20 to 50 parts to 100 parts of total esters, the fatty acid represented in the ester being non-polymerized and non-oxidized, and the polymerized glycol having an average molecular weight of at least approximately 500.

4. An emulsifier comprising higher fatty acid esters of polymerized ethylene glycol, the polymerized glycol having an average molecular weight of at least approximately 500.

5. An emulsifier comprising stearate esters of polymerized ethylene glycol, the esters consisting essentially of a mixture of monostearate and distearate each present in substantial proportions and the polymerized ethylene glycol represented in the ester having an average molecular weight of at least approximately 500.

6. An emulsifier comprising a higher fatty acid ester of polymerized ethylene glycol, the polymerized glycol having an average molecular weight in excess of 1,000.

7. An emulsifier comprising higher fatty acid esters of polymerized ethylene glycol, the mono-ester and di-ester each being present in substantial proportion and the polymerized glycol having an average molecular weight in excess of 1,000.

8. An emulsifier comprising a higher fatty acid ester of polymerized ethylene glycol, the glycol having an average molecular weight of the order of 2,500.

9. An emulsion that is stable in the presence of mineral acids, lime and salts in moderately high concentrations, the emulsion comprising water, dispersed water-insoluble substances, and a stabilizing emulsifier including a higher fatty acid ester of a polymerized polyhydric alcohol, substantially all of the hydroxyl content of the polyhydric alcohol being esterified, the fatty acid represented in the ester being non-polymerized and non-oxidized and the polyhydric alcohol represented having an average molecular weight of at least 500.

10. An emulsion that is stable in the presence of mineral acids, lime and salts in moderately high concentrations, the emulsion comprising water, dispersed water-insoluble particles, and a stabilizing emulsifier including the mixture of esters described in claim 4.

11. An emulsion that is stable in the presence of mineral acids, lime, and salts in moderately high concentrations, the emulsion comprising water, dispersed water-insoluble particles, and a stabilizing emulsifier including a mixture of higher fatty acid esters of polymerized ethylene glycol, the esters including a mixture of a mono-ester and a di-ester of the polymerized glycol, each ester being present in substantial proportion, and the polymerized glycol having an average molecular weight of at least approximately 500.

12. An emulsion that is stable in the presence of mineral acids, lime, and salts in moderately high concentrations, the emulsion comprising water, dispersed water-insoluble particles, and a stabilizing emulsifier including a mixture of higher fatty acid esters of polymerized ethylene glycol, the esters including a mixture of a mono-ester and a di-ester of the polymerized glycol, each ester being present in substantial proportion and the polymerized glycol having an average molecular weight of the order of 2,500.

13. An emulsifier comprising a di-ester of a higher fatty acid with a polymerized polyhydric alcohol and a coupling agent, the coupling agent being a compound selected from the group consisting of the glycol ethers, the glycols and alcohols and serving to improve the solubility of the di-ester in oil and the polymerized polyhydric alcohol represented in the di-ester having an average molecular weight of at least approximately 500.

14. An emulsifier comprising a coupling agent and a mixture of mono- and di-esters of a polymerized glycol with a higher fatty acid, the coupling agent being an organic compound adapted to improve the solubility of the mono- and di-esters in oil and the polymerized glycol represented in the esters having an average molecular weight of at least approximately 500.

HENRY ARNOLD GOLDSMITH.